Nov. 9, 1965 S. KRYSZEK 3,216,086
LATHE OR LIKE TOOLS
Filed Dec. 26, 1963 3 Sheets-Sheet 1
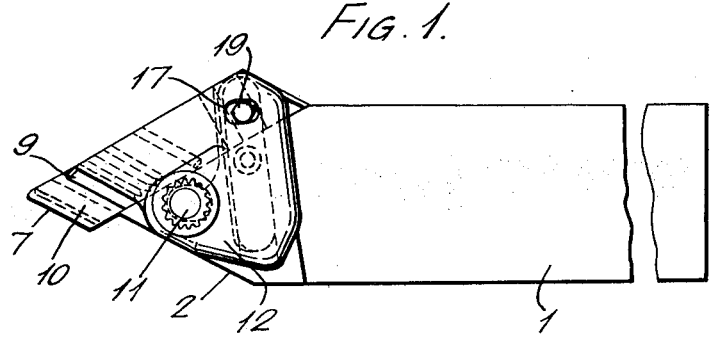
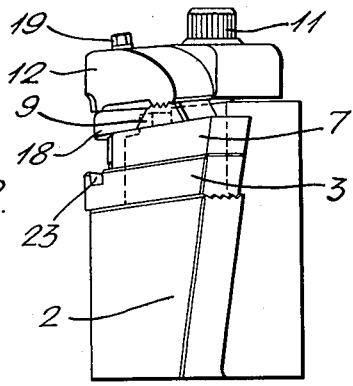
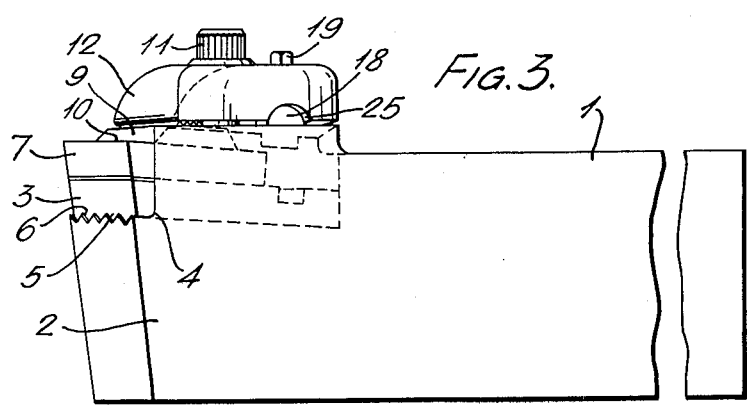
INVENTOR
STANISLAS KRYSZEK
BY
Bacon & Thomas
ATTORNEYS Nov. 9, 1965 S. KRYSZEK 3,216,086
LATHE OR LIKE TOOLS
Filed Dec. 26, 1963 3 Sheets-Sheet 2
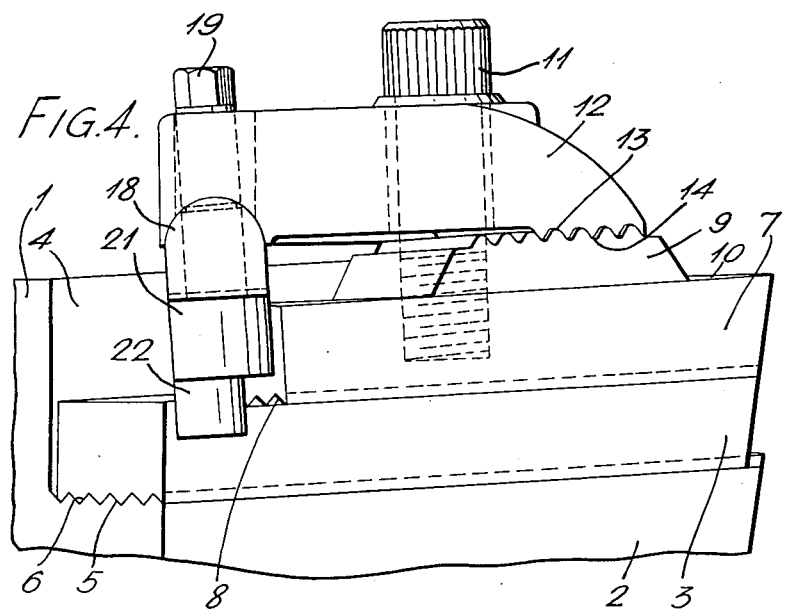
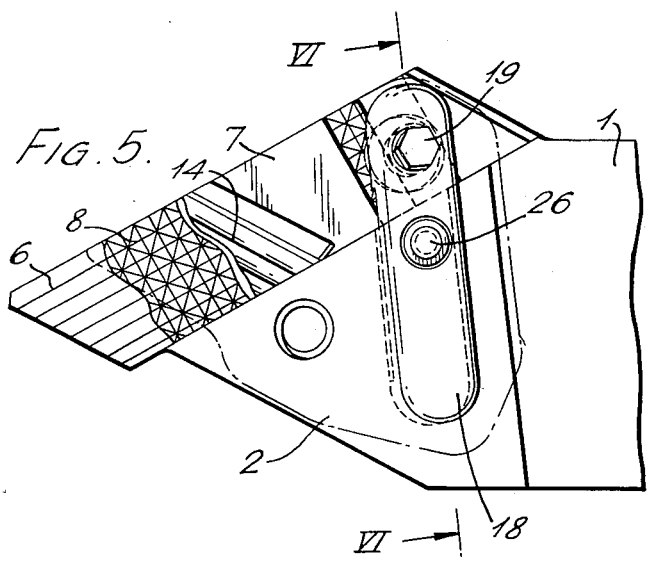
INVENTOR
STANISLAS KRYSZEK
BY
Bacon & Thomas
ATTORNEYS United States Patent Office 3,216,086
Patented Nov. 9, 1965

3,216,086
LATHE OR LIKE TOOLS
Stanislas Kryszek, High Wycombe, England, assignor to Hard Alloys Limited, Buckinghamshire, England, a British company
Filed Dec. 26, 1963, Ser. No. 333,595
Claims priority, application Great Britain, Jan. 1, 1963, 124/63
7 Claims. (Cl. 29—96)

This invention relates to lathe and like tools for carrying out turning, parting, milling and like machining operations.

More particularly this invention relates to so-called mechanically held lathe and like tools of the kind (hereinafter termed "tools of the kind referred to") comprising a shank or holder for mounting a separate cutting tip, of tungsten carbide for example, and clamping means for rigidly clamping the cutting tip to the shank in use of the tool.

According to the present invention there is provided a tool of the kind referred to including a tip seat for supporting the tip thereon and against which, in use of the tool, the tip is clamped by clamping means, said tip seat being movably mounted on the shank for advancement or retraction thereupon under the action of adjusting means providing a continuous adjustment of the posiiton of the seat over a limited range of movement, said tip seat also being adapted to locate the tip thereon for movement therewith so that, except when said tip and tip seat are clamped to the shank, they may be advanced or retracted together by said adjusting means to position the tip as desired.

It will be appreciated that, with the tip and tip seat very lightly held to the shank by the clamping means, the cutting tip of a tool according to the invention may be accurately adjusted relative to the shank, thus simplifying the resetting of the tool when a tip is replaced or reground since the need to reposition the entire tool is avoided. Moreover by use of an appropriate gauge, the ability accurately to move the cutting tip relative to the shank readily enables the tool to be preset prior to mounting in the machine.

The tip seat may be adapted in many ways to locate the tip thereon. Preferably, however, parts are provided on the face thereof which supports said tip for engagement with mating parts on the opposed face of the tip. Such interengaging parts on the tip and tip seat preferably are such as to prevent the tip slipping relative to the tip seat in any direction in the medial plane of the opposed faces while yet permitting adjustment of the tip relative to the tip seat when they are unclamped. Thus such interengaging parts preferably take the form of a plurality of individual depressions and projections in each face, the projections in each face being adapted to engage with the depressions in the other face, each mated projection and depression positively preventing slipping of the parts in all directions in the medial plane of the faces. In a preferred embodiment the said depressions and projections are pyramidical in form, being defined by two intersecting sets of parallel grooves or serrations in the opposed faces of the tip and tip seat.

Tools of the kind referred to and tips therefor adapted for interengagement as above defined are described and claimed in United Kingdom patent specification No. 844,753.

A tool according to the invention may be provided with a chipbreaker which may be located with respect to the shank so as not to participate in movement of the tip seat effected by said adjusting means. In this way the adjusting means provides a simple way of altering as required the chipbreaker width, i.e. the distance between the chipbreaker and the cutting edge of the tip. In a preferred construction a chipbreaker is provided which is located relative to the clamping means. Thus interengaging parts may be provided on opposed faces of the chipbreaker and clamping means. For example, parallel grooves may be provided on the opposed faces of the chipbreaker and clamping means extending transversely to the direction of movement of the tip and tip seat. If desired the interengaging parts of the chipbreaker and clamping means may take any of the forms previously described in connection with the tip and tip seat.

The opposed faces of the tip seat and shank are preferably provided with interengaging parts, such as parallel grooves in each face, which serve to limit the seat to the rectilinear movement under the action of said adjusting means in the direction for advancement and retraction of the tip seat.

The adjusting means may take many forms. Thus in one preferred construction it includes a rotatably mounted member having a cam or cranked portion engaging the tip seat, so that by rotation of the member the tip seat may be caused to be advanced or retracted as required.

Alternatively the adjusting means may comprise a screw-threaded member directly or indirectly connected with the tip seat so that by turning said member the seat may be advanced or retracted. More specifically such screw-threaded member may be mounted within an internally threaded bore in the shank, the bore having its longitudinal axis approximately parallel to the direction of movement of the tip seat upon the shank, and a stud protruding from the tip seat engaging a necked portion of the screw-threaded member, so that by turning the member the tip seat is caused to be advanced or retracted.

The clamping means may simply comprise a clamping block adapted to be clamped to the shank to bear on the tip or chipbreaker, if provided. In this case it may be desirable to provide further clamping means for clamping the rear end of the tip seat, e.g. a cap screw engaging in a slotted rearward extension of the tip seat. Alternatively a single clamping means may be provided which bears both on the tip or chipbreaker and on the rear of the tip seat. In a preferred construction the adjusting means comprises a member extending through a clamping block generally perpendicular thereto to engage the rear end of the tip seat and also serving when the clamping block is tightened to the shank to transmit a clamping force to the rear end of the tip seat to clamp it to the shank.

One embodiment of the invention will now be described by way of example with reference to the accompanying drawings in which:

FIGURE 1 is a plan view of a lathe tool in accordance with the invention;

FIGURE 2 is a front elevation of the tool shown in FIGURE 1;

FIGURE 3 is an elevation of one side of the tool shown in FIGURE 1;

FIGURE 4 is an enlarged fragmentary elevation of the other side of the tool shown in FIGURE 1 showing the cutting head;

FIGURE 5 is an enlarged fragmentary plan view of the cutting head of the tool shown in FIGURE 1 with parts removed and broken away in section to reveal details of construction.

Figure 6:
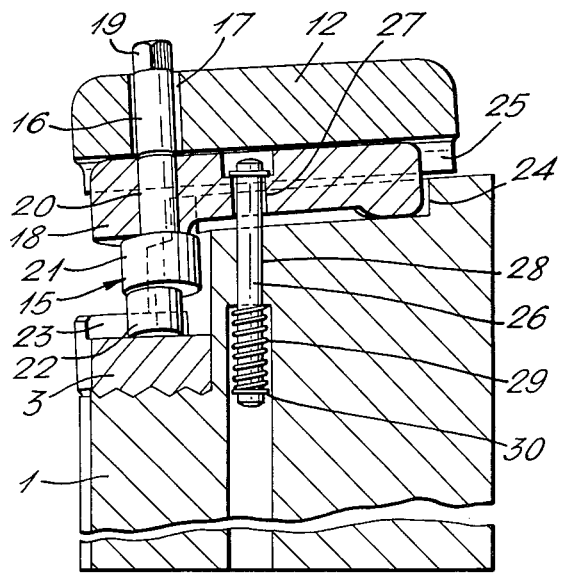
FIGURE 6 is a sectional elevation on the line VI—VI of FIGURE 5.

Referring now to the drawings the lathe tool consists of a shank 1 of steel having a front end 2. A steel tip seat 3 is mounted in a stepped recess 4 in the end 2 of the shank 1, and the opposed faces of the tip seat 3 and the shank 1 are provided with interengaging parts in the form of sets of parallel grooves 5 and 6 in each face, allowing rectilinear sliding movement of the tip seat 3 upon the shank 1 for advancement and retraction thereof in a manner hereinafter described.

A tungsten carbide cutting tip 7 is mounted upon the tip seat 3, and relative movement therebetween in any direction in the medial plane of their opposed faces is prevented by interengaging parts on said faces.

These parts comprise pyramidical projections and depressions 8 defined by two intersecting sets of parallel V-shaped grooves in the faces of the tip and tip seat. It will be appreciated that by lifting the tip 7 off the seat 3 to disengage said projections and depressions 8 the position of the tip 7 on the seat can be adjusted.

A tungsten carbide chipbreaker 9 is slidably mounted upon the top face 10 of cutting tip 7.

Clamping means are provided in the form of a steel clamp block 12 which may be clamped to the shank by a bolt 11 extending through a slot in block 12. Part of the clamping block bears upon the upper surface of the chipbreaker 9 and by tightening the bolt 11 the clamping block may be caused to bear on the chipbreaker with greater or less pressure. The opposed faces of the clamping block 12 and the chipbreaker 9 are provided with interengaging sets of grooves 13 and 14 extending transversely to the parallel grooves 5, 6 in the shank and tip seat. By interengaging appropriate grooves, the chipbreaker may be set at one of a number of positions to vary the chipbreaker width.

The tool includes adjusting means 15 comprising a rotatably mounted shaft 16 passing through a slot 17 in the clamping block 12 and a transverse key 18 disposed between the shank and the clamping block. The shaft 16 extends generally perpendicularly to the clamping block and the upper end 19 thereof, which protrudes above the clamping block, is of hexagonal cross-sectional shape, thus allowing a spanner to be fitted over the end to rotate the shaft 16 about its longitudinal axis.

The shaft 16 is journalled in a hole 20 in the key 18 and has an enlarged cylindrical head 21, coaxial with the shaft 16 and immediately below the key 18 which abuts there-against. From the lower face of the head 21 depends an eccentrically mounted stub shaft 22 which engages in a transverse slot 23 at the rear end of the upper face of the tip seat 3 and abuts the base thereof.

The transverse key 18 is located partly in a transverse groove 24, channel-shaped in cross-section, in the shank 1 and in a groove 25 of generally semicircular cross-sectional shape in the under face of the clamping block 12. The key 18 is of complementary cross-sectional shape but is a slightly loose fit within the grooves 24, 25.

The key 18 is resiliently held in position in the groove 24 by a headed pin 26 which extends through a hole 27 in the key, which hole 27 is countersunk to receive the head of the pin. The pin 26 extends into a hole 28 in the shank 1 which is counterbored from the underside of the shank to house a coiled compression spring 29 disposed around the pin and between the end of the counterbore and a circlip 30 fitted on the end of the pin 26.

To prepare the tool for use, the tip seat 3, tip 7 and chipbreaker 9 are set in approximately their required positions relative to each other and to the shank 1 before clamping, by interengaging the appropriate projections and depressions 8 and grooves 13, 14 respectively. The tool is lightly clamped by means of the bolt 11. The final adjustment of the position of tip 7 is then made by rotation of shaft 16, which through eccentric shaft 22 serves to advance or retract the tip seat 3 and tip 7 as required. Finally, the bolt 11 is fully tightened so that the clamping block 12 bears down on the chipbreaker 13 to clamp it and tip 7 and tip seat 3 to the shank. The block 12 also bears down on key 18 which because of its resilient mounting can rock slightly to transmit the force applied by said block 12 to the shaft 16 through head 21 against which it bears so that the rear end of the tip seat is also clamped to the shank by shaft 16, the end stub shaft 22 thereof bearing against the base of said groove 23 in the tip seat. The tip seat is thus firmly clamped against displacement in use of the tool.

It will be appreciated that many modifications may be made to the preferred embodiment of the invention above described. Thus, for example, in place of or in addition to the clamping action of the adjusting shaft 16, a clamping means distinct from the clamping block 12 e.g. a clamping screw, may be provided for clamping the rear end of the tip seat. It is to be understood moreover that the invention is equally applicable to tools having either a positive or negative rake tip.

I claim:

1. Mechanically held cutting tool for use in lathes and like machines comprising a shank, a separate cutting tip adapted to be carried by said shank and having a lower face provided with a plurality of individual depressions and projections, a tip seat having an upper face provided with a plurality of individual projections and depressions adapted to support the tip thereon and movably mounted on said shank for advancement or retraction thereupon, the individual depressions and projections of said lower face being adapted to engage with the respective individual projections and depressions of said upper face so as to locate said tip nonslidably on said tip seat for movement therewith, adjusting means for providing a continuous adjustment of the position of said tip seat on said shank over a limited range of movement, and clamping means whereby said tip and said tip seat can be immovably clamped to said shank in use of the tool.

2. Mechanically held cutting tool as claimed in claim 1 wherein said depressions and projections are pyramidical in form and are defined by two intersecting sets of parallel grooves or serrations in the opposed faces of the tip and tip seat.

3. Mechanically held cutting tool for use in lathes and like machines comprising a shank, a separate cutting tip adapted to be carried by said shank and having a lower face provided with a plurality of individual depressions and projections, a tip seat having an upper face provided with a plurality of individual projections and depressions adapted to support the tip thereon and movably mounted on said shank for advancement or retraction thereupon, the individual depressions and projections of said lower face being adapted to engage with the respective individual projections and depressions of said upper face so as to locate said tip on said tip seat for movement therewith, adjusting means for providing a continuous adjustment of the position of said tip seat on said shank over a limited range of movement, claimping means whereby said tip and said tip seat can be immovably clamped to said shank in use of the tool, said clamping means having a lower face with a plurality of projections and depressions, and a chipbreaker having an upper face with a plurality of depressions and projections and located relative to said clamping means by interengagement of the respective projections and depressions of said lower face of the clamping means and the depressions and projections of said upper face of the chipbreaker.

4. Mechanically held cutting tool as claimed in claim 3 wherein the projections and depressions in said lower face of the clamping means and in said upper face of the chipbreaker comprise parallel ridges and grooves extending transversely to the direction of movement of the tip and tip seat effected by said adjusting means.

5. Mechanically held cutting tool as claimed in claim 3 wherein said shank has an upper face with a plurality of parallel grooves therein extending in the direction of movement of the tip seat, and said tip seat has a lower face with plurality of parallel grooves therein.

6. Mechanically held cutting tool for use in lathes and like machines comprising a shank having an upper face with a plurality of parallel grooves therein; a separate cutting tip adapted to be carried by said shank and having a lower face with a plurality of individual pyramidical depressions and projections therein; a tip seat having a rear end and a front end adapted to support the tip thereon and having a lower face with a plurality of parallel grooves therein extending from said rear end to said front end whereby said upper face of the shank and said lower face of the tip seat are interengaged so as to allow rectilinear movement of the tip seat on said shank, said tip seat also having an upper face with a plurality of individual projections and depressions whereby said upper face of the tip seat and said lower face of the tip are interengaged to locate said tip for movement with said tip seat; a clamping block adapted to be clamped to the shank so as to bear on said tip whereby said tip and said tip seat can be immovably clamped to said shank in use of the tool, said clamping block having a lower face with a plurality of parallel grooves therein extending transversely to the direction of movement of the tip and tip seat; a chipbreaker having an upper face with a plurality of parallel grooves therein and located relative to said clamping block by interengagement of said lower face of the clamping block and said upper face of the chipbreaker whereby the chipbreaker is held from participation in movement of the tip seat; and a rotatably mounted member extending through said clamping block generally perpendicular to the medial plane of said upper face of the shank and having a cranked portion engaging the tip seat whereby rotation of the member advances or retracts the tip seat as required, said member also having a bearing portion engaging the rear end of the tip seat whereby when the clamping block is tightened said bearing portion transmits a clamping force to the rear end of the tip seat to clamp it to the shank.

7. Mechanically held cutting tool as claimed in claim 6 wherein said shank is provided with a groove, and said lower face of the clamping block is provided with a groove, a key being held resiliently in said groove in the shank and engaging the groove in said clamping block and bearing on said rotatable member extending through the clamping block, whereby said clamping block is located with respect to said shank and the clamping force is transmitted to the rear end of the tip seat to clamp it to the shank when the clamping block is tightened.

References Cited by the Examiner
UNITED STATES PATENTS

| 2,805,468 | 9/57 | Williams | 29—105 |
| 2,900,704 | 8/59 | Sweet | 29—96 |
| 2,911,707 | 11/59 | Almen | 29—96 |
| 3,058,198 | 10/62 | Williams | 29—96 |

FOREIGN PATENTS

| 844,753 | 8/60 | Great Britain. |
| 868,012 | 5/61 | Great Britain. |

WILLIAM W. DYER, Jr., *Primary Examiner.*

HARRISON L. HINSON, *Examiner.*